(12) United States Patent
Slawecki (10) Patent No.: US 7,466,180 B2
(45) Date of Patent: Dec. 16, 2008

(54) CLOCK NETWORK

(75) Inventor: Darren Slawecki, Santa Clara, CA (US)

(73) Assignee: Intel Corporation, Santa Clara, CA (US)

( * ) Notice: Subject to any disclaimer, the term of this patent is extended or adjusted under 35 U.S.C. 154(b) by 674 days.

(21) Appl. No.: 09/735,358

(22) Filed: Dec. 12, 2000

(65) Prior Publication Data

US 2002/0073385 A1  Jun. 13, 2002

(51) Int. Cl.
 *G06F 1/04* (2006.01)
 *H03K 3/00* (2006.01)
(52) U.S. Cl. .................................... 327/299; 327/276
(58) Field of Classification Search ................ 327/276, 327/277, 284, 291, 293, 295, 299
See application file for complete search history.

(56) References Cited

U.S. PATENT DOCUMENTS

| | | | | |
|---|---|---|---|---|
| 5,367,957 A | | 11/1994 | Hennessey | 102/217 |
| 5,726,585 A | * | 3/1998 | Kim | 326/38 |
| 5,732,015 A | * | 3/1998 | Kazerounian et al. | 365/154 |
| 5,740,067 A | | 4/1998 | Hathaway | 364/489 |
| 5,852,379 A | | 12/1998 | Jiang | 327/176 |
| 5,970,367 A | * | 10/1999 | Wanlass | 438/479 |
| 6,163,194 A | * | 12/2000 | Truong et al. | 327/259 |
| 6,269,280 B1 | * | 7/2001 | Miyanishi et al. | 700/121 |
| 6,410,984 B1 | * | 6/2002 | Trivedi et al. | 257/751 |
| 6,420,921 B1 | * | 7/2002 | Okayasu et al. | 327/276 |
| 6,441,665 B1 | * | 8/2002 | Hashidate et al. | 327/270 |
| 6,492,735 B1 | * | 12/2002 | Matsubara | 257/760 |

FOREIGN PATENT DOCUMENTS

| | | | |
|---|---|---|---|
| JP | 63190355 A | * | 8/1988 |
| JP | 08032421 A | * | 2/1996 |

\* cited by examiner

*Primary Examiner*—Quan Tra
(74) *Attorney, Agent, or Firm*—Schwegman, Lundberg & Woessner, P.A.

(57) ABSTRACT

A clock network comprises a clock distribution path coupled to a circuit. The clock distribution path and the circuit are formed on a substrate. The clock distribution path comprises a plurality of interconnected elements and one or more disconnected elements. The disconnected elements can be connected to the plurality of interconnected elements after the clock distribution path is tested in connection with the circuit. In one embodiment, the disconnected elements include a capacitor, an interconnect, and a buffer. In an alternative embodiment, the plurality of interconnected elements include a buffer, an interconnect and a capacitor.

4 Claims, 8 Drawing Sheets

CLOCK NETWORK

FIELD

The present invention relates to clock networks, and more particularly, to tuneable clock networks.

BACKGROUND

Clock networks provide timing signals in logic devices, such as processors, digital signal processors, application specific integrated circuits (ASICs), and communication circuits. Many processors, digital signal processors, ASICs, and communication circuits include millions of logic nodes. In a logic device having millions of logic nodes, a clock network delivers thousands of timing signals to the millions of logic nodes. Each timing signal must arrive at a particular logic node within a specified time interval which is typically on the order of pico-seconds. The arrival time of these timing signals at each of the millions of logic nodes is critical to the correct operation of the logic device. If a timing signal does not arrive at a logic node within its assigned time interval, the logic device fails. If the logic device is embedded in a car, a train, or a plane and the logic device fails, the car, train, or plane may also fail.

The process of manufacturing and testing a logic device is a long, slow process. After a logic device is fabricated, it is electronically tested. To electronically test a logic device, signals at an output port of the logic device are monitored while a sequence of data signals and clock signals is provided at an input port of the logic device. If the monitored signals do not correspond to the input data signals, then the logic device fails the electronic test. After a logic device fails an electronic test, the logic device is analyzed to identify the reason for the failure. In many cases, logic devices fail because a clock signal arrives at a clock node of a data storage device before the corresponding data signal arrives at a data node of the storage device. To correct such defects in a logic device, the logic device is redesigned to speed up the data signal or to slow down the clock signal. Circuits are often added to the logic device to slow down the clock signals. After the logic device is redesigned, it is fabricated again using the same long, slow process that was used to manufacture the original device.

A trend in the integrated circuit industry is to design more complex logic devices. In more complex logic devices, the number of data storage devices increase and the number of clock signals increase. With more data storage devices and more clock signals, the number of failures resulting from clock signals being skewed with respect to data signals also increase. Increasing the number of failures increases the time required to analyze the failures and to re-manufacture the logic devices, which increases the product development cycle time and the cost of the logic device.

For these and other reasons there is a need for the present invention.

DESCRIPTION

In the following detailed description of the invention, reference is made to the accompanying drawings which form a part hereof, and in which are shown, by way of illustration, specific embodiments of the invention which may be practiced. In the drawings, like numerals describe substantially similar components throughout the several views. These embodiments are described in sufficient detail to enable those skilled in the art to practice the invention. Other embodiments may be utilized and structural, logical, and electrical changes may be made without departing from the scope of the present invention. The following detailed description is not to be taken in a limiting sense, and the scope of the present invention is defined only by the appended claims, along with the full scope of equivalents to which such claims are entitled.

Figure 1:
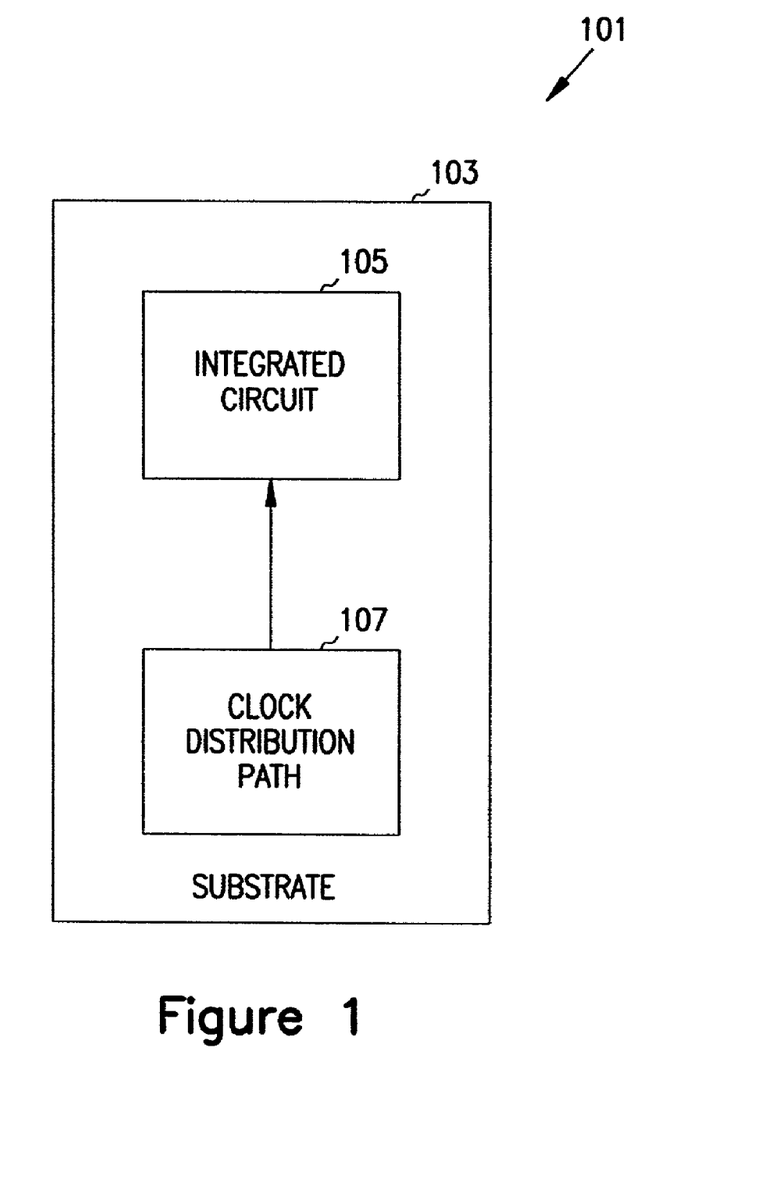
FIG. 1 is a block diagram of one embodiment of a clock network according to the teachings of the present invention.

FIG. 1 is a block diagram of one embodiment of a clock network 101 according to the teachings of the present invention. The clock network 101 includes a substrate 103, an integrated circuit 105, and a clock distribution path 107. The integrated circuit 105 and the clock distribution path 107 are formed on the substrate 103. The substrate 103, in one embodiment, comprises a die, such as a semiconductor die, suitable for use in connection with the fabrication of integrated circuits. However, the substrate is not limited to a semiconductor die. In an alternative embodiment, the substrate comprises a silicon-on-insulator substrate. The clock distribution path 107 is not limited to use in connection with a particular type of integrated circuit. In one embodiment, the integrated circuit 105 is a processor. In an alternative embodiment, the integrated circuit 105 is a application specific integrated circuit.

Figure 2:
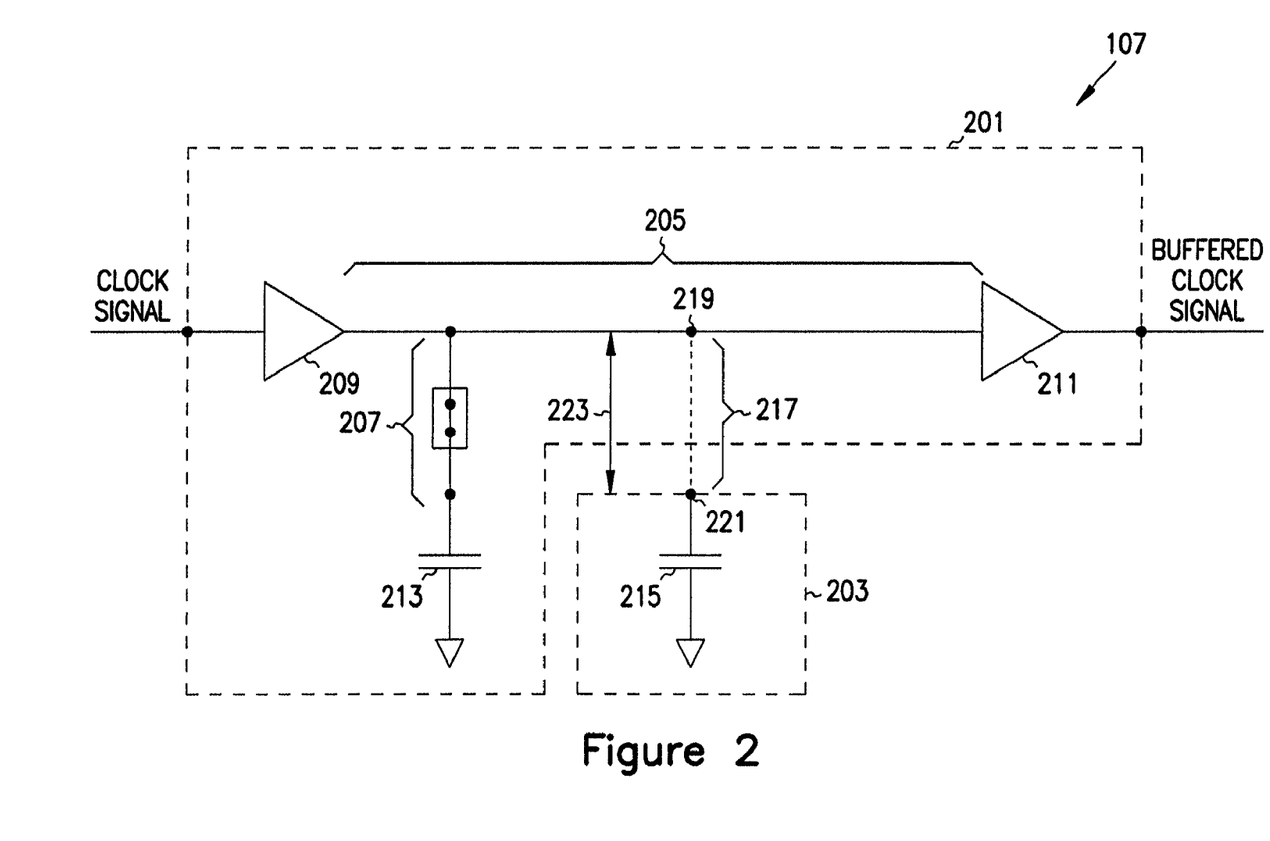
FIG. 2 is an illustration of a schematic diagram of one embodiment of the clock distribution path shown in FIG. 1.

FIG. 2 is an illustration of a schematic diagram of one embodiment of the clock distribution path 107 shown in FIG. 1. The clock distribution path 107 includes a plurality of interconnected elements 201 and one or more disconnected elements 203. In a preferred embodiment, each of the one or more disconnected elements 203 is located in close proximity to at least one of the plurality of interconnected elements 201. In one embodiment, each of the one or more disconnected elements 203 is located at a distance of less than about ten microns from at least one of the plurality of interconnected elements 201. The plurality of interconnected elements 201 include interconnects 205 and 207, buffers 209 and 211, and a capacitor 213. The one or more disconnected elements 203 include a delay element, such as capacitor 215 which is initially disconnected from the plurality of interconnected elements 201. However, the one or more disconnected elements 203 can be connected to the plurality of interconnected elements 201 after the clock distribution path 107 and the integrated circuit 105 (shown in FIG. 1) are formed on the substrate 103 (shown in FIG. 1) and tested. The capacitor 215 is connected to interconnect 205 by interconnect 217 formed by a metal-level only edit between nodes 219 and 221. In one embodiment, the interconnect 217 is formed by depositing a conductive material, such as tungsten, using a focused ion beam (FIB). In an alternative embodiment, the metal-level only mask that would include interconnect 217 is edited to include interconnect 217. In one embodiment, the interconnect 217 formed by the metal-level only edit has a length 223 of less than about one micron. In a preferred embodiment, the metal-level only edit is located with respect to other elements in the clock network 101 such that when viewed from at least one side of the substrate 103, the view of the metal-level only edit is unobstructed by metal layers or devices, such as resistors, capacitors, transistors or diodes. Typically, the one or more disconnected elements 203 are connected to the plurality of interconnected elements 201 to speed up or slow down clock signals propagating on the interconnect 205 after the integrated circuit 105 (shown in FIG. 1) is tested in connection with the clock distribution path 107.

The interconnect 205 provides a conductive path that connects buffer 209 to buffer 211, and the interconnect 207 provides a conductive path that connects the interconnect 205 to capacitor 213 in the clock distribution path 107. After fabrication of the clock distribution path 107, the interconnect 207 may be cut to disconnect the interconnect 205 from the capacitor 213. In one embodiment, the interconnect 207 is cut by an focused ion beam. When added by a metal-level only edit, the interconnect 217 connects the interconnect 205 to the capacitor 215 in the clock distribution path 107. The interconnects 205, 207, and 217 are generally fabricated from a conductive material such as a metal or polycrystalline silicon. Metals suitable for use in the fabrication of the interconnects 205, 207 and 217 include but are not limited to aluminum, copper, silver, and gold, and alloys of aluminum, copper, silver, and gold.

The buffers 209 and 211 provide drive capability for a clock signal being distributed over the clock distribution path 107. The buffers 209 and 211 typically include active devices, such as transistors, capable of driving loads including the interconnects 205, 207, and 217, capacitors 213 and 215, and one or more logic gates (not shown). Since each of the buffers 209 and 211 is only capable of driving a small number of loads, multiple buffers are included in the clock distribution path 107 to drive the large number of loads typically included in the integrated circuit 105 (shown in FIG. 1).

The capacitors 213 and 215 can be connected to the interconnect 205. When connected to the interconnect 205, the capacitors 213 and 215 increase the capacitance of the interconnect 205. The capacitors 213 and 215 are not limited to a particular type of capacitor. In one embodiment, the capacitors 213 and 215 are each fabricated from a metal-oxide-semiconductor field-effect transistor.

Figure 3:
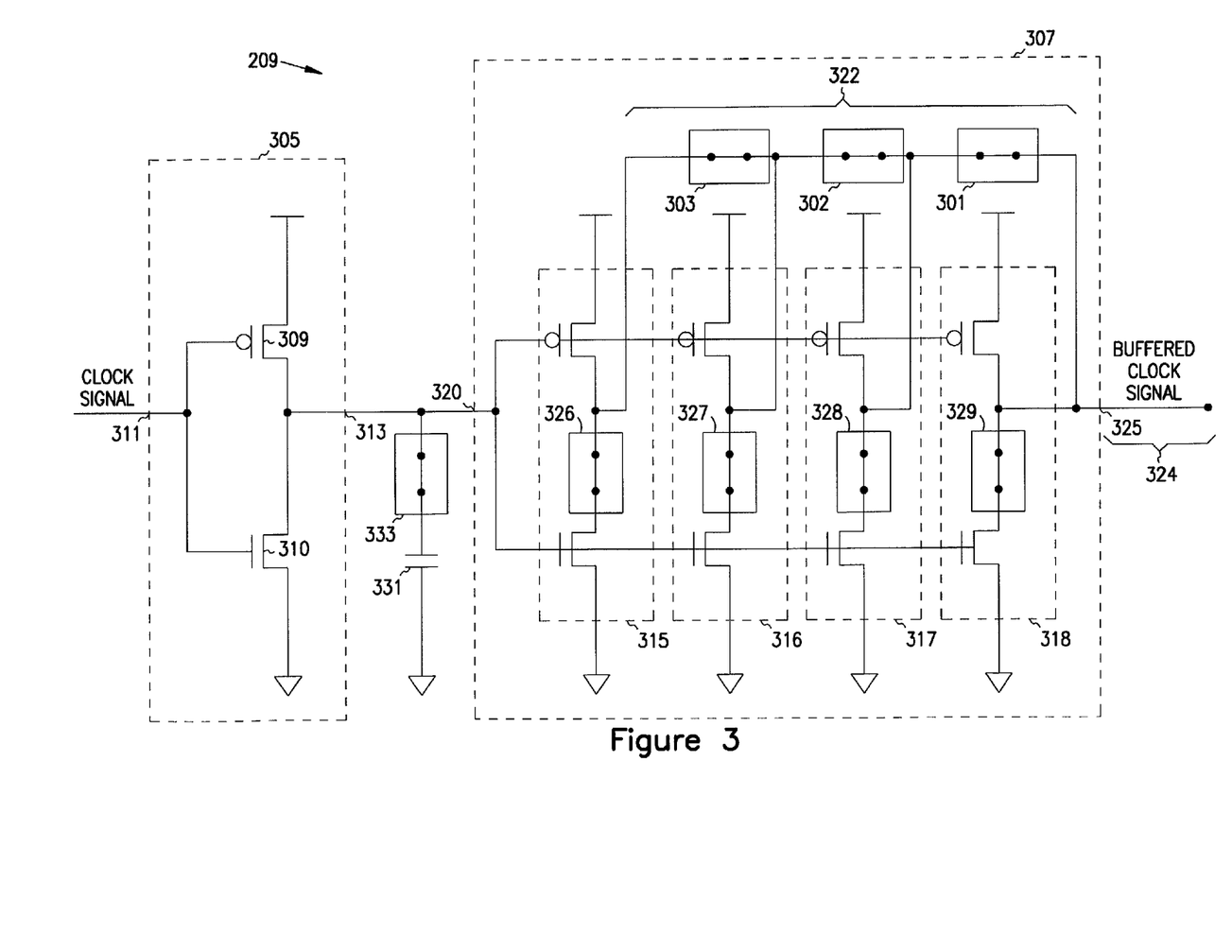
FIG. 3 is an illustration of a schematic diagram of one embodiment of a buffer shown in FIG. 2 including cut points according to the teachings of the present invention.

FIG. 3 is an illustration of a schematic diagram of one embodiment of a buffer 209 shown in FIG. 2 and including the cut points 301-303 according to the teachings of the present invention. A cut point is a location on an interconnect that can be cut in order to prevent electrons from flowing through the interconnect. In one embodiment, the cut points 301-303 can be cut by a focused ion beam. The buffer 209 includes a receiver 305 and a driver 307. The receiver 305 includes a pair of serially connected transistors 309 and 310 that have a common input port 311 and a common output port 313. The driver 307 includes a plurality of transistor pairs 315-318. However, the receiver 305 and the driver 307 are not limited to inverters. The receiver 305 and driver 307 may include other logic devices, such as ANDs, ORs, NANDs, and NORs. Each input port of the transistors in each of the plurality of transistor pairs 315-318 is coupled to a common input port 320. Each output port of each of the transistor pairs 315-318 is coupled to a common interconnect 322 which includes the cut points 301-303. The cut points 301-303 permit modification of the driver 307 after initial fabrication of the buffer 209. The cut point 301-303 control the number of transistor pairs 315-318 included in the driver 307. For example, if the common interconnect 322 is cut at the cut point 301, then only the transistor pair 318 of the driver 307 drives the interconnect 324 coupled to an output port 325 of the driver 307. Similarly, if the common interconnect 322 is cut at the cut point 302 then only the transistor pairs 317 and 318 of the driver 307 drive the interconnect 324. And if the common interconnect 322 is cut at the cut point 303, then only the transistor pairs 316-318 of the driver 307 drive the interconnect 324. Since the number of transistor pairs 315-318 included in the driver 307 determines the current drive capability of the driver 307, controlling the number of transistor pairs 315-318 included in the driver 307 permits speeding up and slowing down of clock signals being propagated to the interconnect 324.

In addition to the cut points described above, other cut points may be included in the buffer 209 shown in FIG. 3. For example, cut points 326-329 may be included in the buffer 209. Cutting one or more of the cut points 326-329 alters the delay time of the BUFFERED CLOCK SIGNAL between the input port 311 and the output port 325 by removing one or more transistors from the driver 307. Alternatively, a capacitor 331 and a cut point 333 may be included in the buffer 207. Cutting the cut point 333 removes the capacitor 331 from the buffer 209 and decreases the delay time of the BUFFERED CLOCK SIGNAL between the input port 311 and the output port 325.

Figure 4:
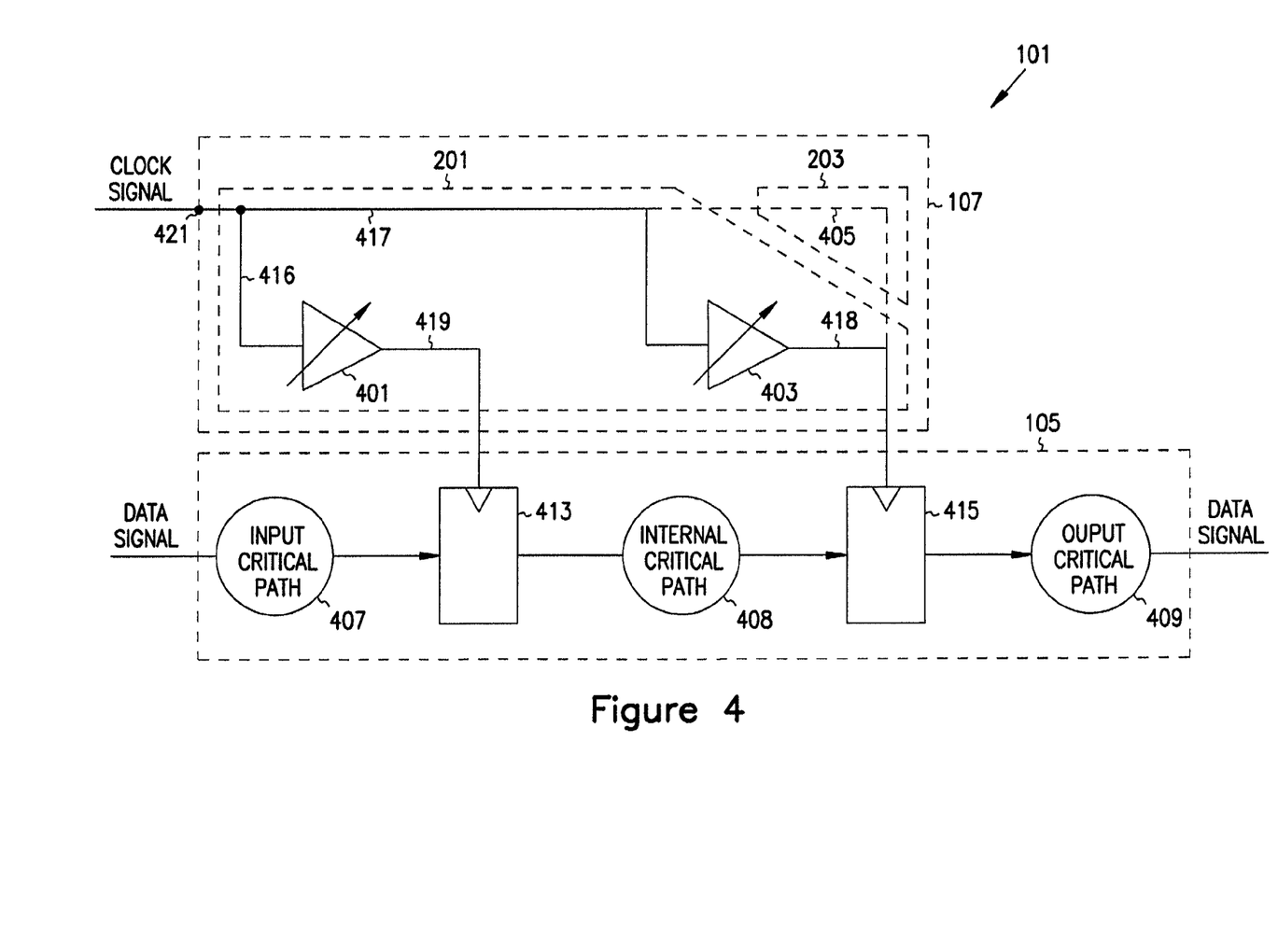
FIG. 4 is an illustration of a schematic diagram of one embodiment of a clock network including a tuneable clock buffer and a bypass interconnect according to the teachings of the present invention.

FIG. 4 is an illustration of a schematic diagram of one embodiment of a clock network 101 including tuneable clock buffers 401 and 403 and a bypass interconnect 405 according to the teachings of the present invention. The clock network 101 is not limited to a particular number of tuneable clock buffers. FIG. 4 shows only clock buffers 401 and 403 for illustration purposes only. In one embodiment, the clock network 101 includes one-thousand tuneable clock buffers. In an alternative embodiment, the clock network 101 includes 100,000 tuneable clock buffers. The clock network 101 includes the integrated circuit 105 and the clock distribution path 107. The integrated circuit 105 includes an input critical path 407, an internal critical path 408, an output critical path 409, and storage devices 413 and 415. The internal critical path 408 couples the storage device 413 to the storage device 415. The input critical path 407 is coupled to an input port of the storage device 413 and the output critical path 409 is coupled to an output port of the storage device 415. The critical paths 407-409 are paths on which data must arrive and be settled at storage devices before the clock transitions.

The clock distribution path 107 includes the interconnected elements 201 and the disconnected elements 203. The interconnected elements 201 include tunable clock buffers 401 and 403, bypass interconnect 405, and interconnects 416-419. The interconnect 416 couples a clock signal from a node 421 to an input port of the tuneable buffer 401. The interconnect 417 couples the clock signal from the node 421 to an input port of the tuneable buffer 403. The interconnect 418 couples an output port of the tunable clock buffer 403 to a clock input port on the storage device 415. The interconnect 419 couples an output port of the tunable clock buffer 401 to a clock input port on the storage device 413. The bypass interconnect 405, when fabricated, couples the interconnect 417 to the input clock port of the storage device 415. The bypass interconnect 405 can be added to the interconnected elements 201 through a modification of a metal-level only mask or a metal-level only edit. A metal-level only mask is a mask used in the fabrication of an integrated circuit that only defines a metallization level of the integrated circuit. Changing a metal-level only mask is a less expensive design change for a substrate than a design change that requires changing masks that define circuit features other than metallization features.

After fabrication of the integrated circuit 105 and clock distribution path 107, the arrival time of a clock signal at the clock input port of the storage device 413 is adjusted by adjusting tunable clock buffer 401. (A tuneable clock buffer is shown in FIG. 3 and a method for adjusting a tuneable clock buffer is described above.) The arrival time of a clock signal at the clock input port of the storage device 415 is adjusted by adjusting the tunable clock buffer 403. In an alternative embodiment, the arrival time of the clock signal at the clock input port of the storage device 415 is set by adding the bypass interconnect 405 between the interconnect 417 and the interconnect 418.

Figure 5:
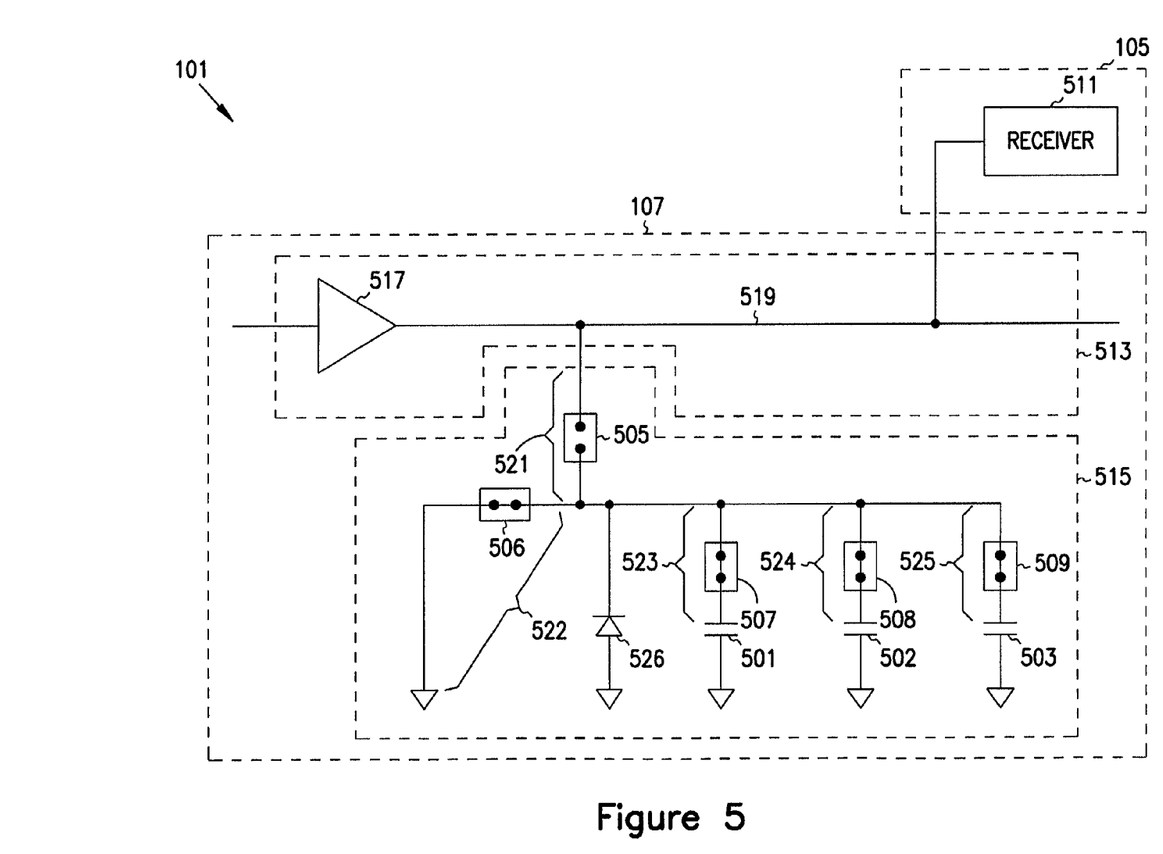
FIG. 5 is an illustration of a schematic diagram of one embodiment a clock network including capacitors, a metal-level only edit point, and cut points according to the teachings of the present invention.

FIG. 5 is an illustration of a schematic diagram of one embodiment a clock network 101 including capacitors 501-503, metal-level only edit point 505, and cut points 506-509 according to the teachings of the present invention. The clock network 101 includes the integrated circuit 105 having a receiver 511 and a clock distribution path 107. Receiver 511 is not limited to a particular type of receiver. Any circuit, such as a logic circuit or transistor circuit, capable of receiving an electronic signal is suitable for use as the receiver 511. The clock distribution path 107 includes interconnected elements 513 and disconnected elements 515. The interconnected elements 513 include a buffer 517 connected to an interconnect 519 which connects the buffer 517 to the receiver 511. The disconnected elements 515 include interconnects 521-525 and capacitors 501-503. Each of the interconnects 522-525 includes one of the cut points 506-509. The diode 526 is included to prevent destruction of the capacitors 501-503 from static charge build-up during the fabrication of the clock network 101.

The disconnected elements 515 provide a mechanism for adding capacitance to the interconnect 519 in the clock distribution path 107. The maximum capacitance is added to the interconnect 519 by applying a metal-level only edit to the metal-level only edit point 505 and by cutting the interconnect 522 at the cut point 506. After cutting the cut point 506, the capacitance added to the interconnect 519 is decreased from the maximum capacitance by cutting one or two of the cut points 507-509. Cutting the interconnect 523 at the cut point 507 reduces the capacitance coupled to the interconnect 519 from the maximum capacitance by the capacitance of capacitor 501. Cutting the interconnect 524 at the cut point 508 reduces the capacitance from the maximum capacitance coupled to the interconnected 519 by the capacitance of capacitor 502. Cutting the interconnect 525 at the cut point 509 reduces the maximum capacitance coupled to the interconnect 519 by the capacitance of the capacitor 503. Cutting two of the three interconnects 523-525 reduces the capacitance from the maximum capacitance coupled to the interconnect 519 by the sum of the capacitances of the capacitors 501-503 coupled to the cut interconnects. Methods other than cutting interconnects may be used for reducing the capacitance. For example, a capacitor may be deleted or removed by focused ion beam (FIB) milling in which a beam of gallium ions is used to remove the capacitor.

Figure 6:
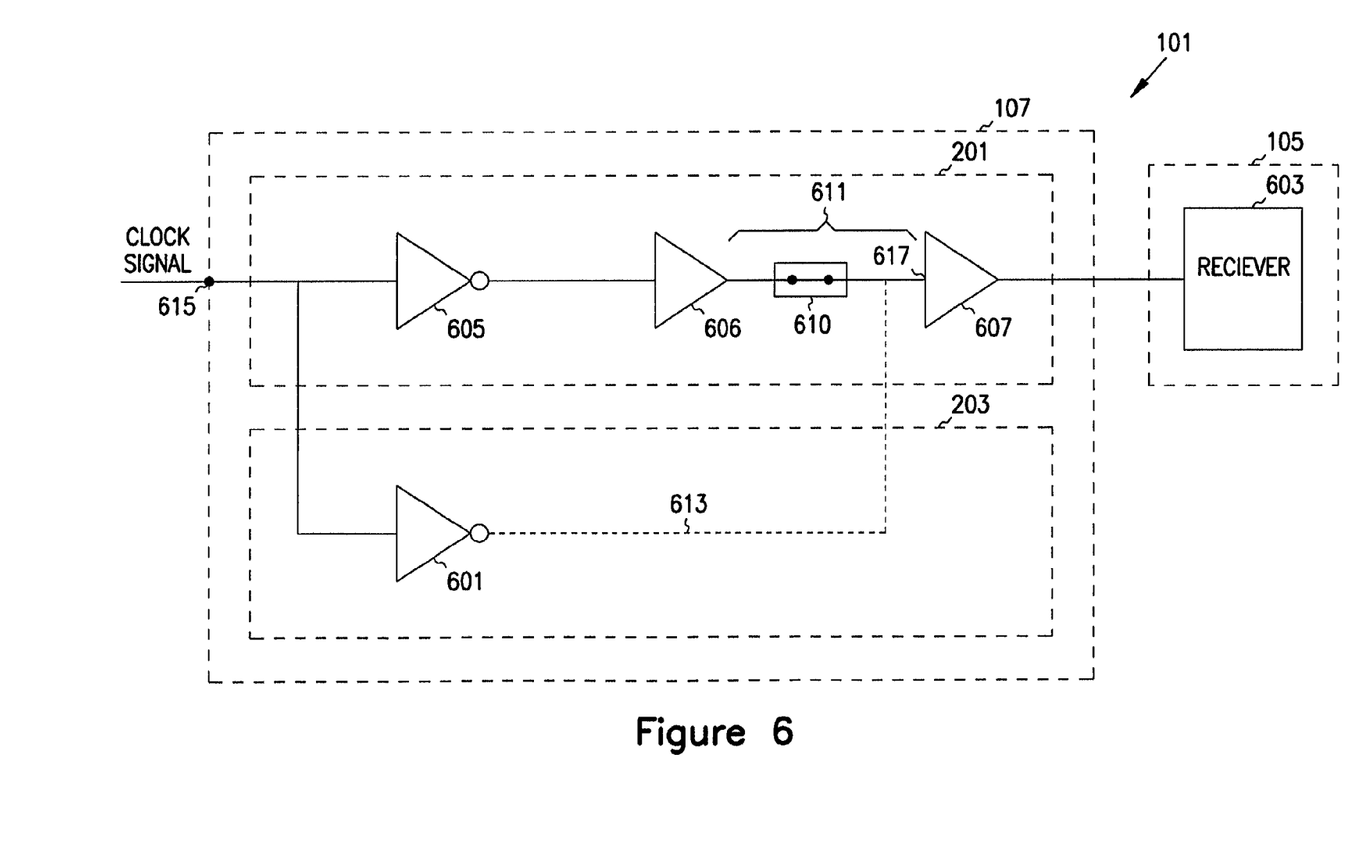
FIG. 6 is an illustration of a schematic diagram of one embodiment of a clock network including a spare buffer according to the teachings of the present invention.

FIG. 6 is an illustration of a schematic diagram of one embodiment of a clock network 101 including a spare buffer 601 according to the teachings of the present invention. The clock network 101 includes the integrated circuit 105 and the clock distribution path 107. The integrated circuit 105 includes a receiver 603. The clock distribution path 107 includes the interconnected elements 201 and the disconnected elements 203. The interconnected elements 201 include buffers 605-607 and interconnect 611 which includes a cut point 610. The disconnected elements 203 include the spare buffer 601. The spare buffer 601 is not limited to an inverting type buffer. In one embodiment, the spare buffer 601 is a non-inverting type buffer. The buffer 607 of the clock distribution path 107 is coupled to the receiver 603 of the integrated circuit 105.

Although the clock network 101 shown in FIG. 6 shows a receiver 603 in the integrated circuit 105 and the spare buffer 601 in the disconnected elements 203, the present invention is not limited to a single storage device in the integrated circuit 105 or a single buffer in the disconnected elements 203. In fact, the present invention is perhaps most useful in integrated circuits in which the number of storage devices and the number of disconnected elements is large. In one embodiment, the integrated circuit 105 includes at least 100,000 storage devices and the plurality of disconnected elements 203 includes at least 1000 disconnected elements.

After fabrication of the integrated circuit 105 and the clock distribution path 107, the clock signal arriving at an input port of the receiver 603 is adjusted by disconnecting the buffer 606 from the buffer 607 and connecting the spare buffer 601 to the buffer 607. The buffer 606 is disconnected from the buffer 607 by cutting the interconnect 611 at the cut point 610. In one embodiment, the interconnect 611 is cut by a focused ion beam. The spare buffer 601 is connected to the buffer 607 through a metal-level only edit by adding an interconnect 613 between the spare buffer 601 and the buffer 607. In one embodiment, the metal-level only edit is formed by a focused ion beam depositing metal at the location of the interconnect 613. In this way, the delay between node 615 and an input port 617 of the buffer 607 is changed from the path delay of the path that includes the buffers 605 and 606 to the path delay of the path that includes only the spare buffer 601.

Figure 7:
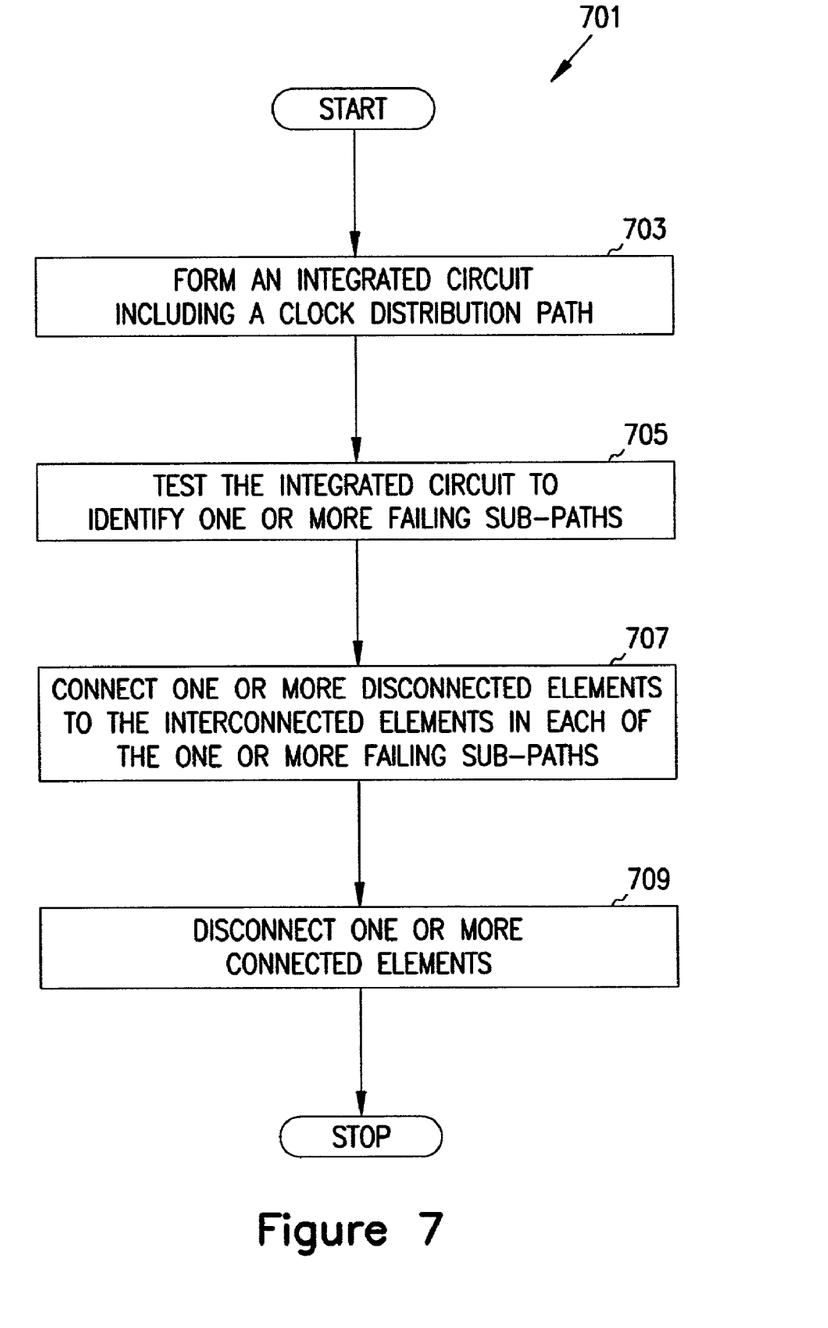
FIG. 7 is a flow diagram of a method of testing an integrated circuit clock network and correcting errors in the integrated circuit clock network according to the teachings of the present invention.

FIG. 7 is a flow diagram of one embodiment of a method 701 of testing an integrated circuit clock network and correcting errors in the integrated circuit clock network according to the teachings of the present invention. The method 701 includes the operations of forming an integrated circuit including a clock distribution path (block 703), testing the integrated circuit to identify one or more failing sub-paths (block 705), connecting one or more disconnected elements to the interconnected elements in each of the one or more failing sub-paths (block 707), and disconnecting one or more elements (block 709). A sub-path includes any passive or active elements that couple nodes in an integrated circuit. Exemplary passive and active elements included in sub-paths include interconnects, capacitors, buffers, and transistors. A sub-path fails when a signal transmitted over the sub-path does not arrive at a logic device, buffer, receiver, or storage device at the time required to operate the logic device, buffer, receiver, or storage device as intended. In an alternative embodiment, forming an integrated circuit on a substrate, the integrated circuit including a clock distribution path having a plurality of interconnected elements and one or more disconnected elements includes forming a processor on the substrate. In another alternative embodiment, testing the integrated circuit to identify one or more failing sub-paths in the clock distribution path includes providing one or more signals at an input port of the integrated circuit, monitoring one or more output signals at an output port of the integrated circuit to identify an incorrect signal, and identifying a failing sub-path by analyzing the incorrect signal. In still another alternative embodiment, identifying a failing sub-path by analyzing the incorrect signal includes identifying a storage device in which a data signal arrives after a clock signal. In yet another alternative embodiment, connecting at least one of the one or more disconnected elements to the interconnected elements in at least one of the one or more failing sub-paths includes connecting a capacitor to the interconnected elements in each of the one or more failing sub-paths. In still another embodiment, connecting at least one of the one or more disconnected elements to the interconnected elements in at least one of the one or more failing sub-paths includes connecting a buffer to at least one the one or more failing sub-paths.

Figure 8:
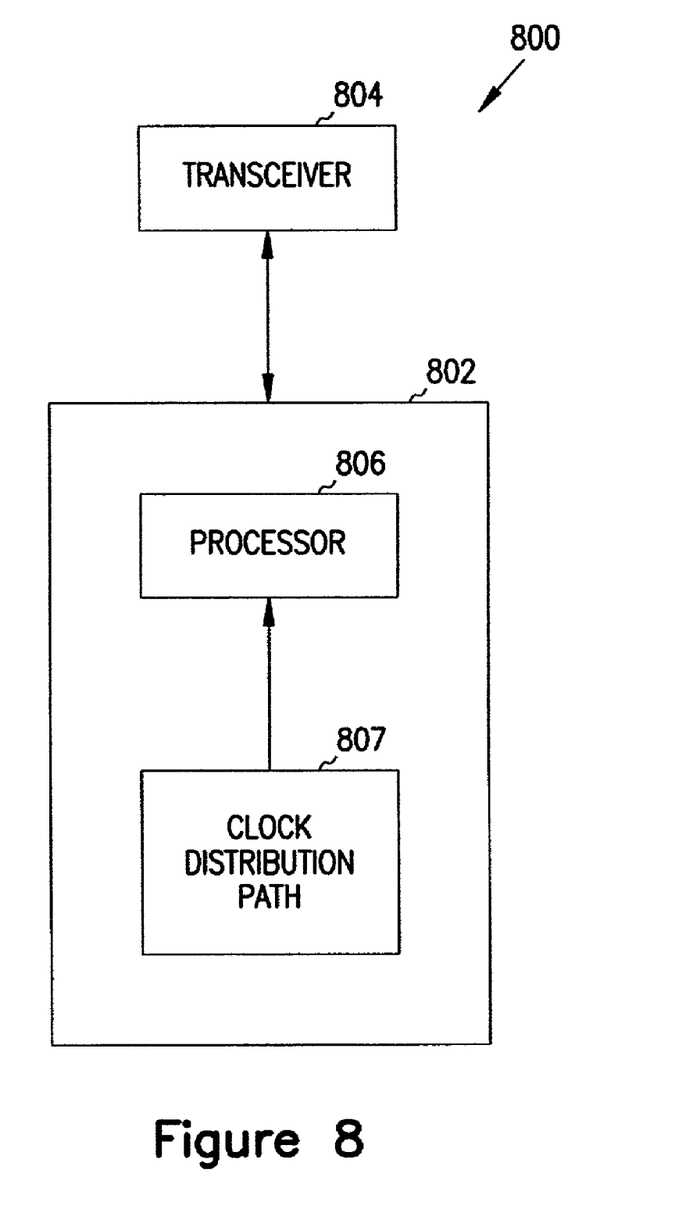
FIG. 8 is a block diagram of a communication unit including a clock network according to the teachings of the present invention.

FIG. 8 is a block diagram of a communication unit 800 including a clock network 802 according to the teachings of the present invention. The communication unit 800 is capable of sending and receiving information signals including but not limited to voice signals, data signals, and mixed voice and data signals. The digital communication unit 800 includes a transceiver unit 804 and the clock network 802. The clock network 802 includes a processor unit 806 and the clock distribution path 107. The transceiver unit 804 is not limited to a particular type of transceiver. Exemplary transceiver units suitable for use in connection with the present invention include radio frequency transceiver units and optical transceiver units. The processor unit 806 is not limited to a particular type of processor. Exemplary processor units suitable for use in connection with the present invention include microprocessors, digital signal processors, reduced instruction set processors, other types of processing units and complex instruction set computing systems.

Although specific embodiments have been described and illustrated herein, it will be appreciated by those skilled in the art, having the benefit of the present disclosure, that any arrangement which is intended to achieve the same purpose may be substituted for a specific embodiment shown. This application is intended to cover any adaptations or variations of the present invention. Therefore, it is intended that this invention be limited only by the claims and the equivalents thereof.

What is claimed is:

1. A clock network comprising:
   a plurality of interconnected elements formed on a substrate, the plurality of interconnected elements being capable of distributing a clock signal having a plurality of arrival times; and
   one or more disconnected elements formed on the substrate, at least one of the one or more disconnected elements including a diode and a capacitor, and wherein at least one of the plurality of interconnected elements is capable of being disconnected from the plurality of interconnected elements to alter at least a first one of the plurality of arrival times and at least one of the one or more disconnected elements is capable of being connected to the plurality of interconnected elements to alter at least a second one of the plurality of arrival times.

2. The clock network of claim 1, wherein at least one of the one or more disconnected elements is capable of being connected to the plurality of interconnected elements by a modification of a metal level only mask.

3. The clock network of claim 2, wherein at least one of the plurality of interconnected elements is capable of being disconnected from the plurality of interconnected elements by cutting an interconnect using a focused ion beam.

4. The clock network of claim 1, wherein the at least one of the one or more disconnected elements including a diode and a capacitor comprises a plurality of capacitors.

* * * * *